(12) United States Patent
Trigui et al.

(10) Patent No.: US 8,498,207 B2
(45) Date of Patent: Jul. 30, 2013

(54) DYNAMIC LOAD BALANCING

(75) Inventors: Hafedh Trigui, Ottawa (CA); Rick Cuthill, Reston, VA (US); Richard Glenn Kusyk, Ottawa (CA)

(73) Assignee: Reverb Networks, Ashburn, VA (US)

( * ) Notice: Subject to any disclaimer, the term of this patent is extended or adjusted under 35 U.S.C. 154(b) by 4 days.

(21) Appl. No.: 12/385,752

(22) Filed: Apr. 17, 2009

(65) Prior Publication Data
US 2009/0323530 A1    Dec. 31, 2009

Related U.S. Application Data

(60) Provisional application No. 61/075,799, filed on Jun. 26, 2008.

(51) Int. Cl.
*H04W 72/00* (2009.01)
(52) U.S. Cl.
USPC ........... 370/235; 370/252; 370/338; 370/329; 455/453; 455/562.1; 455/436; 455/445
(58) Field of Classification Search
USPC ................... 370/235, 252, 338; 455/453, 455
See application file for complete search history.

(56) References Cited

U.S. PATENT DOCUMENTS

| | | | |
|---|---|---|---|
| 5,425,051 A | | 6/1995 | Mahany |
| 5,796,722 A | * | 8/1998 | Kotzin et al. ............... 370/252 |
| 5,802,144 A | | 9/1998 | Laird et al. |
| 5,859,839 A | * | 1/1999 | Ahlenius et al. ........... 370/252 |
| 6,051,408 A | * | 4/2000 | Bartsch et al. ............ 435/128 |
| 6,069,871 A | * | 5/2000 | Sharma et al. ............. 370/209 |
| 6,138,016 A | * | 10/2000 | Kulkarni et al. ............ 455/433 |
| 6,141,565 A | | 10/2000 | Feuerstein et al. |
| 6,253,077 B1 | | 6/2001 | Burt et al. |
| 6,400,335 B1 | * | 6/2002 | Weaver et al. ............. 343/853 |
| 6,549,529 B1 | | 4/2003 | Drabeck et al. |
| 6,574,477 B1 | * | 6/2003 | Rathunde ................. 455/453 |
| 6,829,491 B1 | * | 12/2004 | Yea et al. ................. 455/560 |
| 6,937,863 B1 | | 8/2005 | Gordon et al. |
| 6,999,766 B1 | * | 2/2006 | Padovani ................. 455/437 |
| 7,016,685 B1 | * | 3/2006 | Cain et al. ................ 455/453 |
| 7,149,478 B2 | | 12/2006 | Hawe |

(Continued)

FOREIGN PATENT DOCUMENTS

| | | |
|---|---|---|
| EP | 2129175 | 12/2010 |
| EP | 1952657 | 8/2011 |

OTHER PUBLICATIONS

International Search Report issued Jun. 18, 2010 in International (PCT) Application No. PCT/US2010/31603.

(Continued)

*Primary Examiner* — Ricky Ngo
*Assistant Examiner* — Rasheed Gidado

(57) ABSTRACT

A method, program, system and apparatus perform dynamic load balancing of coverage areas in a wireless communication network. The dynamic load balancing is performed by evaluating cell congestion based on location information of subscribers in the wireless communication network, collecting network parameters related to the wireless communication network and altering network parameters based on the evaluated cell congestion. After the network parameter is altered, the coverage areas are narrowed. Improvements in cell congestion and quality of server are then determined based on the narrowing of the coverage areas. Altering of the plurality of network parameters and evaluating of the cell congestion are performed continuously until a target quality of service is achieved.

36 Claims, 6 Drawing Sheets

U.S. PATENT DOCUMENTS

| | | | |
|---|---|---|---|
| 7,260,415 B1* | 8/2007 | Oh | 455/522 |
| 7,349,765 B2 | 3/2008 | Reaume et al. | |
| 7,477,920 B2 | 1/2009 | Scheinert et al. | |
| 7,561,876 B2 | 7/2009 | Chiou et al. | |
| 7,577,103 B2 | 8/2009 | Diaz et al. | |
| 7,606,287 B2 | 10/2009 | Mahany | |
| 7,609,747 B2 | 10/2009 | Mahany | |
| 7,623,455 B2* | 11/2009 | Hilla et al. | 370/232 |
| 7,653,407 B2 | 1/2010 | Backes et al. | |
| 7,768,968 B2 | 8/2010 | Plehn et al. | |
| 7,877,095 B2 | 1/2011 | Hubner et al. | |
| 7,877,108 B2 | 1/2011 | Wengerter et al. | |
| 7,904,080 B2 | 3/2011 | Atkins et al. | |
| 7,941,136 B2 | 5/2011 | Reed et al. | |
| 7,969,896 B2 | 6/2011 | Sheinfeld et al. | |
| 8,023,529 B2 | 9/2011 | Oh et al. | |
| 2003/0100344 A1 | 5/2003 | Garmonev et al. | |
| 2003/0191856 A1* | 10/2003 | Lewis et al. | 709/241 |
| 2003/0229478 A1 | 12/2003 | Rappaport et al. | |
| 2004/0018839 A1 | 1/2004 | Andric et al. | |
| 2004/0117226 A1 | 6/2004 | Laiho et al. | |
| 2004/0196834 A1 | 10/2004 | Ofek et al. | |
| 2004/0229621 A1* | 11/2004 | Misra | 455/445 |
| 2004/0266442 A1 | 12/2004 | Flanagan et al. | |
| 2005/0176440 A1* | 8/2005 | Sang et al. | 455/453 |
| 2005/0243723 A1* | 11/2005 | Randriamasy | 370/235 |
| 2005/0259571 A1 | 11/2005 | Battou | |
| 2005/0277444 A1 | 12/2005 | Rensburg et al. | |
| 2006/0083170 A1* | 4/2006 | Silva et al. | 370/238 |
| 2006/0221886 A1 | 10/2006 | Rao | |
| 2006/0239224 A1* | 10/2006 | Borst et al. | 370/329 |
| 2006/0246844 A1 | 11/2006 | Kroboth et al. | |
| 2007/0002765 A1 | 1/2007 | Kadaba et al. | |
| 2007/0021151 A1* | 1/2007 | Mori et al. | 455/562.1 |
| 2007/0066298 A1 | 3/2007 | Hurst | |
| 2007/0094729 A1 | 4/2007 | Hoefelmeyer et al. | |
| 2007/0147297 A1* | 6/2007 | Diaz et al. | 370/331 |
| 2007/0195721 A1 | 8/2007 | Backes et al. | |
| 2007/0218862 A1* | 9/2007 | Tatman et al. | 455/403 |
| 2007/0248039 A1 | 10/2007 | Backes et al. | |
| 2008/0020801 A1 | 1/2008 | Fesas et al. | |
| 2008/0039089 A1* | 2/2008 | Berkman et al. | 455/436 |
| 2008/0207195 A1 | 8/2008 | Ranta et al. | |
| 2008/0225714 A1* | 9/2008 | Denis | 370/232 |
| 2008/0268833 A1 | 10/2008 | Huang et al. | |
| 2008/0311924 A1 | 12/2008 | Lucidarme | |
| 2009/0003236 A1 | 1/2009 | Aoyama et al. | |
| 2009/0023477 A1 | 1/2009 | Staudte | |
| 2009/0036116 A1 | 2/2009 | Kim et al. | |
| 2009/0047968 A1 | 2/2009 | Gunnarsson et al. | |
| 2009/0075648 A1* | 3/2009 | Reed et al. | 455/424 |
| 2009/0075655 A1 | 3/2009 | Dobson et al. | |
| 2009/0131038 A1 | 5/2009 | MacNaughtan et al. | |
| 2009/0163223 A1* | 6/2009 | Casey | 455/453 |
| 2009/0221297 A1 | 9/2009 | Wengerter et al. | |
| 2009/0227261 A1 | 9/2009 | Tiirola et al. | |
| 2009/0257353 A1 | 10/2009 | Song et al. | |
| 2009/0264130 A1 | 10/2009 | Catovic et al. | |
| 2009/0312022 A1 | 12/2009 | Viorel et al. | |
| 2009/0315736 A1 | 12/2009 | Reichl et al. | |
| 2009/0323530 A1 | 12/2009 | Trigui et al. | |
| 2010/0008293 A1 | 1/2010 | Gupta et al. | |
| 2010/0046369 A1 | 2/2010 | Zhao et al. | |
| 2010/0075682 A1 | 3/2010 | del Rio-Romero | |
| 2010/0103911 A1 | 4/2010 | Ji | |
| 2010/0124934 A1 | 5/2010 | Mach | |
| 2010/0130194 A1 | 5/2010 | Dickey | |
| 2010/0149984 A1 | 6/2010 | Kapoor et al. | |
| 2010/0159936 A1 | 6/2010 | Brisebois et al. | |
| 2010/0190488 A1 | 7/2010 | Jung et al. | |
| 2010/0203881 A1 | 8/2010 | del Rio Romero et al. | |
| 2010/0216453 A1 | 8/2010 | Kallin et al. | |
| 2010/0216477 A1 | 8/2010 | Ryan | |
| 2010/0232318 A1 | 9/2010 | Sarkar | |
| 2010/0254344 A1 | 10/2010 | Wei et al. | |
| 2010/0278161 A1 | 11/2010 | Ore et al. | |
| 2010/0299419 A1 | 11/2010 | Ramankutty et al. | |
| 2011/0009105 A1 | 1/2011 | Lee et al. | |
| 2011/0014925 A1 | 1/2011 | Antic et al. | |
| 2011/0028144 A1 | 2/2011 | Catovic et al. | |
| 2011/0044165 A1 | 2/2011 | Ni et al. | |
| 2011/0045865 A1 | 2/2011 | Viering et al. | |
| 2011/0090820 A1 | 4/2011 | Hussein et al. | |
| 2011/0092195 A1 | 4/2011 | Hussein et al. | |
| 2011/0096687 A1 | 4/2011 | Dottling et al. | |
| 2011/0105139 A1 | 5/2011 | On | |
| 2011/0130135 A1 | 6/2011 | Trigui | |
| 2011/0136478 A1 | 6/2011 | Trigui | |
| 2011/0141972 A1 | 6/2011 | Oh et al. | |
| 2012/0087269 A1 | 4/2012 | Hussein et al. | |
| 2012/0295609 A1 | 11/2012 | Li et al. | |

OTHER PUBLICATIONS

International Search Report issued Nov. 24, 2010 in International (PCT) Application No. PCT/US2010/050627.

International Search Report and Written Opnion of the International Searching Authority issued Nov. 15, 2010 in International (PCT) Application No. PCT/US2010/048929.

U.S. Office Action mailed Dec. 22, 2011 for U.S. Appl. No. 12/718,189, filed Mar. 5, 2010.

U.S. Office Action mailed Dec. 29, 2011 for U.S. Appl. No. 12/634,057, filed Dec. 9, 2009.

International Search Report and Written Opinion of the International Search Authority issued Nov. 3, 2010 in International (PCT) Application No. PCT/US2010/048927.

Amirijoo et al., "Cell Outage Management in LTE Networks," COST 2100 TD(9)941, Vienna, Austria, Sep. 28-30, 2009.

Mueller et al., "A Cell Outage Detection Algorithm Using Neighbor Cell List Reports Wanke".

U.S. Office Action mailed Feb. 27, 2012 for U.S. Appl. No. 12/385,752, filed Apr. 17, 2009.

"Self-Optimizing Networks: The Benefits of SON in LTE," 4G Americas, Jul. 2011.

U.S. Final Office Action mailed Aug. 29, 2012 for U.S. Appl. No. 12/718,189, filed Mar. 5, 2010.

International Search Report and Written Opinion mailed Nov. 5, 2012 for PCT Application No. PCT/US2012/054204.

Mueller et al., "A Cell Outage Detection Algorithm Using Neighbor Cell List Reports" Springer-Verlag Berlin Heidelberg, Copyright 2008.

* cited by examiner

DYNAMIC LOAD BALANCING

CROSS-REFERENCE TO RELATED APPLICATIONS

This application claims priority to U.S. Provisional Patent Application No. 61/075,799 entitled "Method and Apparatus for Dynamic Load Balancing in Wireless Communication Networks" filed on Jun. 26, 2008, the contents of which are fully incorporated herein by reference.

BACKGROUND OF THE INVENTION

1. Field of the Invention

The present invention generally relates to dynamic load balancing in a wireless communication network. In particular, the present invention relates to dynamic load balancing by altering the coverage areas and optionally altering network parameters such as frequencies of one or a plurality of coverage areas.

2. Description of the Related Art

Network planning relies on static approaches for site locations and dimensioning of the radio resources to meet a specified traffic demand at busy hours. Dimensioning fixed resources to satisfy traffic demand for busy hours is an ineffective planning practice and is very expensive for service providers since the resources for every site are often over estimated to meet traffic demand that may occur only in limited time durations.

Apart from optimizing the hardware resources, service providers have to dramatically reduce interference in their network to maximize the number of subscribers and/or the quality that those subscribers can achieve. Smart antennas were the leading technology and have been considered for IEEE802.16e-2005 and 3GPP LTE standards. Smart antennas or adaptive beamforming use a plurality of antennas to null interferers or track a desired subscriber by means of a narrow beam. However, complex signal processing is required in the base stations, which increases the cost of wireless equipment. Adaptive digital beamforming, as described in IEEE802.16e-2005 for example, is implemented for each subscriber in a cell.

The above standard (i.e., IEEE802.16e-2005) describes generally ways for setting up the best radiation pattern from base stations to a mobile subscriber and tracking it if necessary according to its mobility in the cell. However, detailed implementation is left unspecified by the standard. Additionally, because of the complexity of the implementation, most of base station vendors have decided not to implement beamforming in their initial products. Initial deployments of products have been more focused on demonstrating the basic features of the broadband technology rather than optional features such as beamforming.

Therefore, it would be useful to implement an apparatus that can dynamically adjust radio resources and network parameters to match a time varying traffic demand. Additionally, it would be useful to use one or more antennas to create multiple coverage areas that are optimized according to actual user distribution in the wireless communication network and to achieve interference reduction capability by narrowing down coverage areas, while deploying standard base stations rather than new ones that are equipped with adaptive beamforming capability.

SUMMARY OF THE INVENTION

An embodiment of the invention is directed to a method for dynamic load balancing of coverage areas in a wireless communication network. The method includes evaluating cell congestion based on location information of subscribers in a wireless communication network; collecting network parameters related to the wireless communication network; and altering network parameters based on the evaluated cell congestion. After the network parameters are altered, the coverage areas are narrowed. Improvements in cell congestion and quality of service are then determined based on the narrowing of the coverage areas. Altering of the plurality of network parameters and evaluating of the cell congestion are performed continuously until a target quality of service is achieved.

The narrowing of the coverage area reduces cell congestion by optimizing the coverage area according to actual subscriber distribution within the wireless communication network. Additionally, by narrowing of the coverage areas, for congested areas, overlapping of coverage areas and the number of subscribers in handover zones are reduced. Also, narrowing of the coverage area for some cells increases the range of the coverage areas for other cells. Improvement in the cell congestion and quality of service can be determined based on, for example, a dropped call percentage and a congestion ratio.

An embodiment of the invention is directed to program recorded on a computer-readable storage medium for dynamic load balancing of coverage areas in a wireless communication network. The program causes a computer to execute dynamic load balancing steps that includes evaluating cell congestion based on location information of the subscribers in the wireless communication network; collecting network parameters related to the wireless communication network; altering network parameters based on the evaluated cell congestion; narrowing coverage areas based on the altered network parameter; and determining if there is an improvement in the cell congestion and quality of service based on altered network parameters.

An embodiment of the invention is directed to a system for dynamic load balancing of coverage areas in a wireless communication network. The system includes a network management apparatus that monitors and performs management of the wireless communication network; at least one controller configured to perform data communications with the network management apparatus; at least one base station configured to perform data communication with the controller; at least one antenna array configured to perform data communication with the base station and the subscribers distributed in coverage areas; and a dynamic load balancing apparatus configured to perform data communication with the network management apparatus and the antenna array.

The load balancing apparatus is also configured to evaluate cell congestion based on location information of the subscribers in the wireless communication network; collect network parameters related to the wireless communication network; alter network parameters based on the evaluated cell congestion; narrow coverage areas based on the altered network parameters; and determine if there is an improvement in the cell congestion and quality of service based on the altered network parameters. The altering of the network parameters and evaluating of the cell congestion are performed continuously until a target quality of service in the wireless communication network is achieved.

The system of the invention also includes a location unit configured to gathering location information regarding the subscribers in the wireless communication network. The location unit provides location information to the dynamic load balancing apparatus. Additionally, the system includes an extraction module configured to extract network statistics, network topology and parameters, and a target performance criteria related to the wireless communication network. The extraction module is also configured to perform data communications with the network management apparatus and the dynamic load balancing apparatus.

In an embodiment of the invention, the dynamic load balancing apparatus includes a communication interface; at least one processor; and a memory. The memory is configured to store a dynamic load balancing program that causes the apparatus to perform the load balancing method noted above. The memory includes a computer-readable storage medium such as a CD-ROM, RAM or other external storage device.

BRIEF DESCRIPTION OF THE DRAWINGS

In the drawings, like reference numbers generally indicate identical, functionally similar and/or structurally similar elements. Embodiments of the invention will be described with reference to the accompanying drawings, wherein.

Figure 1:
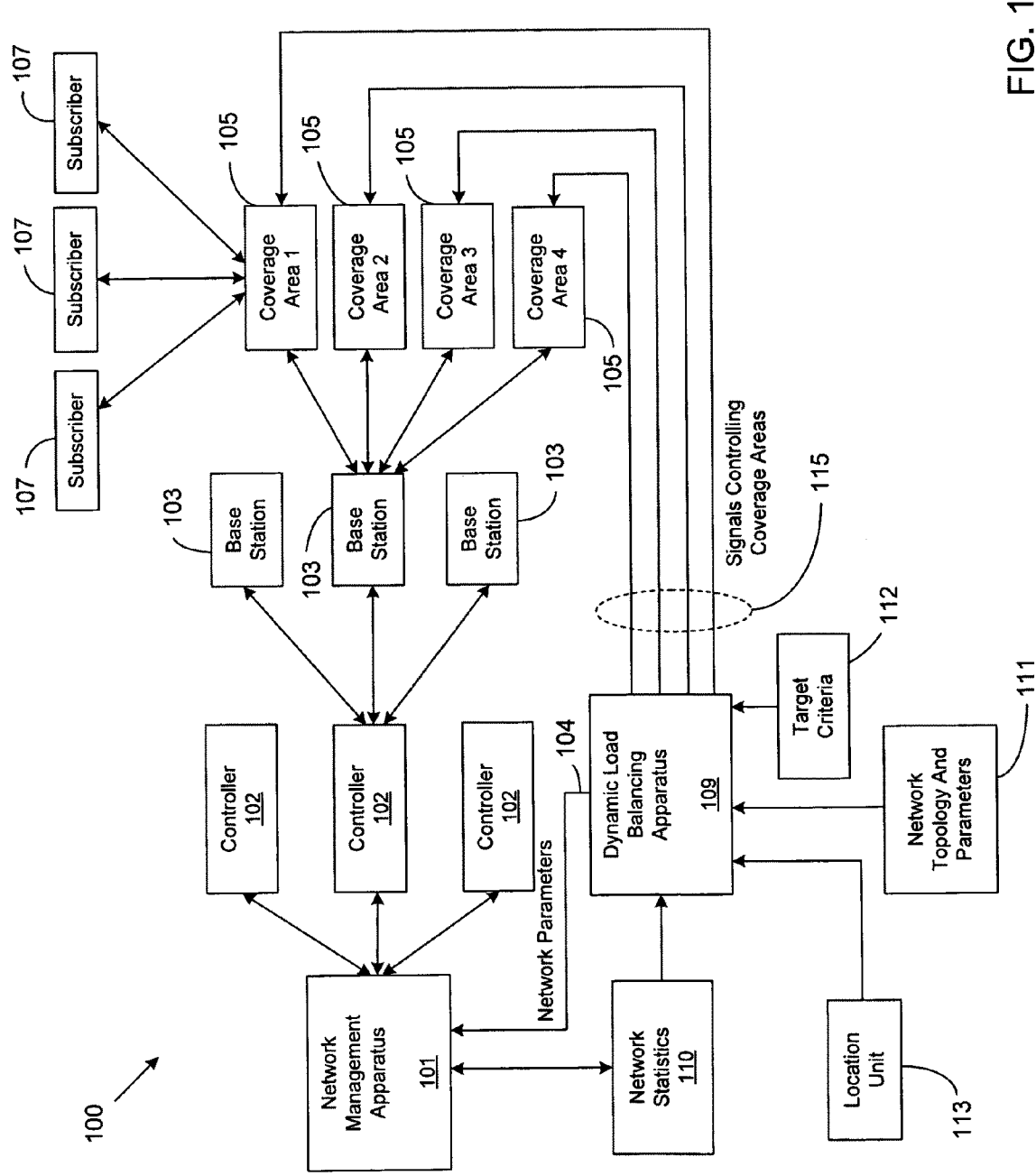
FIG. 1 illustrates a system for implementing dynamic load balancing in a wireless communication network in accordance with an embodiment of the invention.

Additional features are described herein, and will be apparent from the following description of the figures.

DETAILED DESCRIPTION OF THE INVENTION

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

In the drawings accompanying the description that follows, often both reference numerals and legends (labels, text descriptions) may be used to identify elements. If legends are provided, they are intended merely as an aid to the reader, and should not in any way be interpreted as limiting.

FIG. 1 is a system for implementing dynamic load balancing in a wireless communication network in accordance with an embodiment of the invention. In particular, the wireless communication network 100 illustrated in FIG. 1 includes a dynamic load balancing apparatus 109. The wireless communication network 100 refers to any type of computer network that is wireless, and is commonly associated with a telecommunications network whose interconnections are implemented without the use of wires such as with electromagnetic waves, such as radio waves or the like as a carrier. The basic components of the wireless communication network 100 include a network management apparatus 101, one or more controllers 102, and one or more base stations 103 for supporting data communications between subscribers 107 distributed throughout coverage areas 105 provided by the wireless communication network 100.

The network management apparatus 101 exercises monitoring and control over the wireless communication network 100. The network management apparatus 101 may include, for example, a network operation center (NOC) that analyze problems, perform troubleshooting, communication with site technicians and other NOCs. The network management apparatus 101 may also include any server or other computer implemented to monitor and control the wireless communication network 100. Although FIG. 1 illustrates only one network management apparatus 101, it should be understood that more than one network management apparatus 101 is possible. As seen in FIG. 1, the network management apparatus 101 receives network statistics 110 related to the wireless communication network 100 for assisting in the monitoring and control functions performed.

The controllers 102 illustrated in FIG. 1 are, for example, base station controllers (BSC), which are part of the wireless system infrastructure that control one or more of the base stations 103 and the corresponding coverage areas 105 provided by the base stations 103. A plurality of subscribers 107 are distributed within the coverage areas 105 for participating in wireless data communications provided by the wireless communications network 100. The subscribers 107 may include various types of fixed, mobile, and portable two way radios, cellular telephones, personal digital assistants (PDAs), or other wireless networking devices.

Each coverage area 105 behaves as an independent sector serving its own set of subscribers 107. Receive diversity can be supported by the same coverage areas 105 generated by means of an orthogonal polarization in the antenna (not shown) or by totally separate antennas (not shown). Alternatively, receive diversity can be supported in angular domain by associating a coverage area 105 to one antenna port and another coverage area 105, typically the adjacent one, to another port. However, both coverage areas 105 are active in the transmit direction.

Similarly, multiple input multiple output (MIMO) modes are supported by feeding similar coverage areas 105 to each MIMO branch using polarization, angle or space domains. For fixed wireless systems, such as IEEE802.16-2004, each coverage area 105 can be used by a single base station 103 or plurality of base stations 103 operating each on a different frequency channel. For mobile systems, subscribers 107 of a single coverage area 105 are served by a single base station 103 that can be a single frequency channel for supporting communications in accordance with IEEE802.16e-2005 or multiple frequency channels for supporting communications in accordance with IEEE802.16m.

The dynamic load balancing apparatus 109 can be a server or other similar computer device capable of executing an algorithm for performing dynamic load balancing. A more detailed discussion of the structure of the dynamic load balancing apparatus 109 is noted below with reference to FIG. 6. As illustrated in FIG. 1, the dynamic load balancing apparatus 109 receives network topology parameters 111 such as locations of base station (BS) and subscriber station (SS), height of BS and SS antennas relative to terrain and sea level, antenna type, antenna pointing direction, antenna tilt direction, antenna radiation pattern, antenna gain and initial frequency plan.

Additionally, the dynamic load balancing apparatus 109 also receives equipment and installation characteristics such as a noise figure, maximum transmit power, losses, a receive diversity flag, supported multi-antenna modes, supported modulation and coding schemes, a duplexing mode, supported sub-carriers permutation scheme; and configuration parameters for each base station or subscriber station equipment such as downlink/uplink TDD ratio, frequency band, center frequency and channel bandwidth.

The dynamic load balancing apparatus 109 may also receive subscribers statistics such as mean and standard deviation of receive strength signal indicator (RSSI) and carrier to interference ratio (CIR), current transmitter power, current uplink and downlink modulation schemes, cyclic redundancy check (CRC) and header check sequence (HCS) errors, receive and transmit throughput for data packets, number of blocked sessions, number of dropped sessions. A full list for WiMAX can be found in IEEE802.16f and IEEE802.16i.

As illustrated in FIG. 1, the dynamic load balancing apparatus 109 receives information regarding a target criteria 112 related to a target quality of service provided to the subscribers 105; and location information regarding the subscribers from a location unit 113. The location unit 113 may include a global positioning system (GPS) device that provides exact location information of the subscribers 107. However, location information may also be obtained based on a first install technique or extrapolated from other measurements, or even by referring to map coordinates.

For example, for a wireless mobile system, subscriber tracking may be determined based on location information embedded in the wireless network components such as the controllers 102. The dynamic load balancing apparatus 109 includes an algorithm that analyzes the data related to the wireless communication network 100 and sends control signals 115 for altering or shaping the coverage areas 105. The load balancing algorithm clustering users based on their instantaneous locations or by means of heuristic approaches; collects statistics to validate previous users clustering decisions and/or predicting new traffic patterns; and continuously learns and adaptively shapes the coverage areas 10, and alters network parameters as the environment or traffic density changes with time. As seen in FIG. 1, network statistics received by the dynamic load balancing apparatus 109 can also be provided to the network management apparatus 101.

Apart from changing coverage areas in terms of pointing directions and azimuth width of some sub-sectors, the load balancing algorithm may alter other parameters such as antenna tilt angles; transmit power values and frequency plan. The load balancing algorithm is not restricted to a single technology and, instead, is adaptable to multiple technologies. The load balancing algorithm can optimize multiple service provider networks if sharing data, such as network statistics and equipments characteristics, between them is possible.

Figure 2:
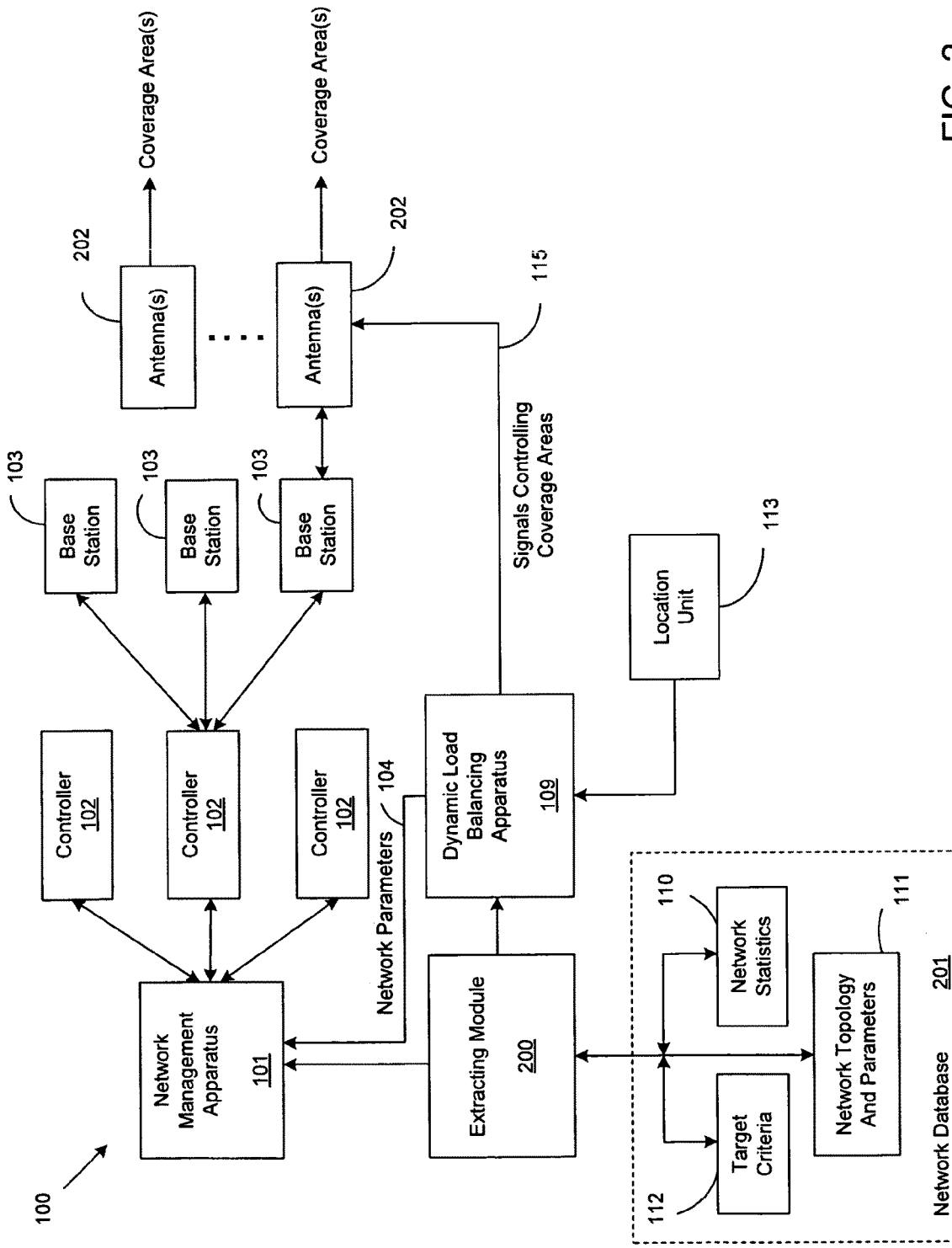
FIG. 2 illustrates another similar system for implementing dynamic load balancing in a wireless communication network in accordance with an embodiment of the invention.

FIG. 2 is system for implementing dynamic load balancing in a wireless communication network in accordance with another embodiment of the invention. The system in FIG. 2 is different from the system in FIG. 1 in that it includes the use of an extraction module 200 and a network database 201. Additionally, FIG. 2 also includes a plurality of antenna arrays 202 that support the coverage areas 105 provided by the wireless communication network 100. Like elements in FIGS. 1 and 2 will not be discussed in detail with reference to FIG. 2, since a description of those elements was provided already in the discussion of FIG. 1 above.

The extraction module 200 extracts the network statistics 110, network topology and parameters 111, and target criteria 112 related to the wireless communication network 100; and provides the information regarding the wireless communication network 100 to the dynamic load balancing apparatus 109. The extraction module 200 can be a server or other computing device that extracts the information (e.g., network statistics 110, network topology and parameters 111 and target criteria 112) from a network database 201. The network topology parameters 111 includes locations of a base station (BS) and a subscriber station (SS), height of BS and SS antennas relative to terrain and sea level, antenna type, antenna pointing direction, antenna tilt direction, antenna radiation pattern, antenna gain and initial frequency plan.

Additionally, the target criteria 112 relates to a certain quality of service to be provided by the wireless communication network 100, which can be set by an operator and stored in the network database 201. Network statistics 110 include a number of established calls, a number of dropped calls; a number of blocked calls and the like. Additionally, network statistics 110 may also include a mean and standard deviation of receive strength signal indicator (RSSI) and a carrier to interference ratio (CIR), current transmitter power, current uplink and downlink modulation schemes, cyclic redundancy check (CRC) and header check sequence (HCS) errors, receive and transmit throughput for data packets, a number of blocked sessions, and a number of dropped sessions.

The extraction module 200 may also provide network statistics 110 and other information regarding the wireless communication network 100 to the network management apparatus 101. The dynamic load balancing apparatus 109 receives information (e.g., network statistics 110, network topology and parameters 111 and target criteria 112) regarding the wireless communication network 100; and provides control signals 115 for controlling coverage areas 105 to the antenna arrays 202. Each antenna array 202 can be a multiple of active antennas coupled to a common source or load to produce a directive radiation pattern forming the coverage areas 105. For example, the antenna array can be an integrated digital antenna array.

Figure 3:
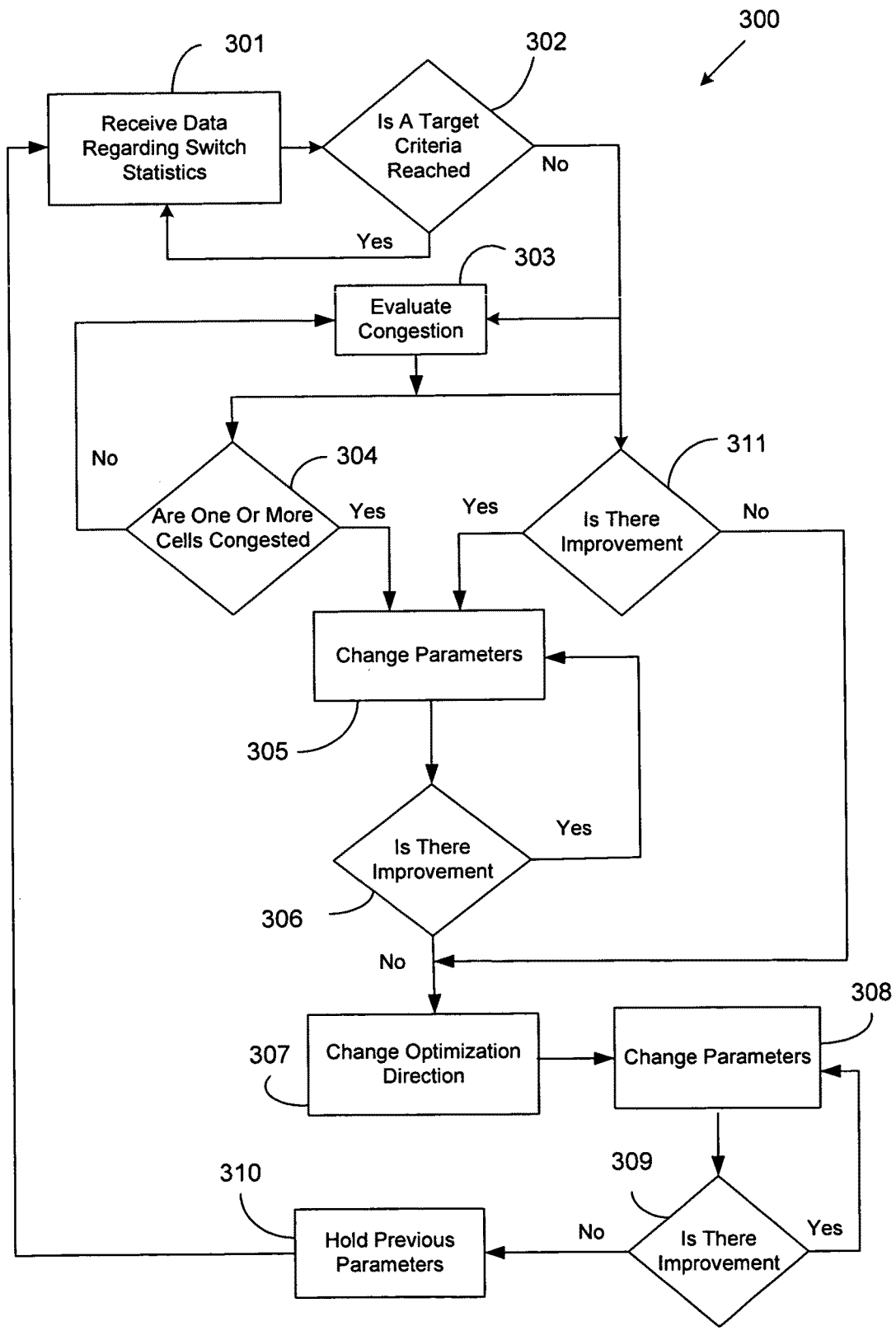
FIG. 3 illustrates a flowchart of a method of dynamic load balancing in accordance with an embodiment of the invention.

FIG. 3 illustrates a flowchart of a method of dynamic load balancing in accordance with an embodiment of the invention. By way of example, the dynamic load balancing apparatus 109 can execute an algorithm stored therein for performing the method 300 in FIG. 3.

In step 301, the dynamic load balancing apparatus 109 receives data regarding switch statistics. The switch statistics can be sampled once an hour or more frequently if needed. The switch statistics may include, but are not limited to the following:

Exemplary Switch Statistics
UL and DL Stats For Each Sector/Carrier: Load, Erlangs and Throughput
Capacity For Each Sector/Carrier
Sensitive KPIs To Operators Per Sector/Carrier Such as Dropped Calls and Blocked Calls
Location Of Most Users (Clusters)
Year/Month/Day/Time
Cell ID
Antenna ID
Carrier Frequency
Number Of Established Calls
Channel Elements (CE) Primary Use
% Primary Traffic CE Usage
% Secondary Traffic CE Usage
Total CE Usage (Erlang)
Peak # of Walsh Codes
Soft Handover Overhead %
Peak DL Power
Number Of Dropped And Lost Calls
Number Of Blocked Calls
UL Thermal Noise Floor (main)
UL thermal Noise Floor (diversity)
Average DL Power Pilot, Paging and Sync Channels Powers
Peak Number of Primary Walsh codes
Reported Or Calculated Sector Load For UL In step 302, the dynamic loading balancing apparatus 109 determines, based on the switch statistics (and other network parameters), whether the current operating conditions of the wireless communication network 100 have reached or satisfied a target criteria. The target criteria can be predetermined. For example, the target criteria can be operator specific and can be changed or priorities altered to match the quality of service needed or desired in the wireless communication network 100. If the target criteria 112 are currently being met, then the dynamic load balancing apparatus 109 continues to receive and monitor switch statistics related to the wireless communication network 100.

Otherwise, in step 303, the congestion in the coverage areas is evaluated, which is also referred to as cell congestion. Congestion refers to the number of subscribers within the coverage areas. Cell congestion can be defined as a ratio of the average downlink power to the maximum base station transmit power. A high ratio is an indication of a high number of active subscribers in the cell. In step 304, if one or more of the cells are congested, then in step 305 one or more of network parameters are altered. The network parameters include, but are not limited to, the following:

Exemplary Network Parameters
Site Latitude And Longitude
Type: Macro-Cell, Micro-Cell, Repeater
Handoff Parameters (T_Add, T_Drop, Tt_Drop, T_Comp)
PA Output Power
Antenna Direction
Antenna Height Above Ground And Sea Level
Antenna Model, Azimuth BW, Elevation BW, Gain, Electrical And Mechanical Tilt
PN Offset Per Sector
Morphology: Urban, Highway, Suburban, Rural, Dense Urban
Number Of RF Carriers Per Sector And Their Frequencies
Equipment Multi-Antenna Capability: Rx Diversity, STC, MIMO
Losses From PA Output To Antenna Ports If Applicable
Multi-Carriers To Antennas Mapping
Technology: WIMAX, UMTS, HSxPA And Supported Features By The Equipment In step 306, the dynamic load balancing apparatus 109 determines if there is any improvement in the operating conditions of the wireless communication network 100 based on the changes made to one or more of the network parameters. If there is improvement, then the one or more of network parameters continued to be changed (as in step 305) until it is determined if there is no improvements in the operating conditions of the wireless communication network 100. In step 307, the optimization direction of the antenna 202 is modified and in step 308 one or more network parameters are changed, if it is determined that there is no improvement in operating conditions of the wireless communication network 100 in step 306.

Similar to step 306, in step 309, it is determined again if there is improvement in the operating conditions in the wireless communication network 100 based on the change in optimization direction and changes in parameters. If there is improvement, then the one or more of network parameters continue to be changed (as in step 308) until it is determined if there is no improvement in the operating conditions of the wireless communication network 100. In step 310, if there is no improvement in network operating conditions, then the previous network parameters set are held. The switch statistics are again received (as in step 301) and it is determined if the target criteria is reached or satisfied (as in step 302).

Also, if the target criteria is not reached, then in step 311, it is determined if there is any improvement in network operating conditions. If there are improvements in network operating conditions then steps 305-310 are performed. If there are no improvements, then steps 307-310 are performed.

Exemplary Implementation

For hotspot regions of any mature wireless communication network, capacity demand is much higher than any other part of the network. After exhausting all the possible improvements in radio transceivers technology and radio resource management algorithms, the only solution left for satisfying high capacity demand is the classical one in cellular networks of considering more cells or sectors in the network. Additionally, finding new sites locations for dense urban areas is very challenging due to the finite number of tall buildings already occupied and the reluctance of building towers impacting the landscape and the historic and economic value of some cities. Moreover, these towers are heavily taxed to avoid or at least limit their appearance in cities. Therefore, antenna counts become of major importance to wireless operators.

The alternative of adding antennas and cell sites is to consider sub-sectorization by means of antenna arrays. A single passive antenna array can be used to create multiple fixed coverage areas but an active antenna array will be preferred to alter the boundaries of coverage areas whenever needed for matching the instantaneous traffic demand. In addition to splitting the azimuth in coverage areas, a two dimensional active antenna array can offer more flexibility in creating and tailoring coverage areas. Although an active antenna array offers the flexibility preferred by load balancing algorithms, it shall not be considered as a restriction or the only means of creating coverage areas of arbitrary wanted shapes.

By way of example, it is assumed that the required number of sectors to meet the peak traffic demand has been determined along with their locations and frequency plan. The present invention, for example, optimizes base station transmit power, antenna tilt, sub-sectors pointing direction and azimuth widths to balance the traffic between sub-sectors and therefore increase subscribers' satisfaction. For each parameter, a minimum, a maximum and a step size values are defined so that a finite number of possibilities are evaluated by the algorithm. Average downlink power, number of used codes or channel elements and noise rise are typical network statistics available.

From an initial network configuration, congested cells can be identified by for example evaluating the ratios previously defined and considering the highest one for a particular cell. Congestion can be alleviated by reducing the coverage for those cells while increasing the coverage of other cells so that no coverage holes are created and the traffic is better distributed. Reducing the coverage can be achieved by reducing base station transmit power or down tilting the antenna or reducing the azimuth width of the sub-sectors or combination of two or more of those actions. Conversely, increasing the coverage is achieved by increasing the base station transmit power or up tilting the antenna or increasing the azimuth width of the sub-sectors or combining two or more of those actions.

The step size for each parameter is evaluated to avoid making dramatic changes that may significantly alter network performance and stability. Gradual parameters changes can be made and validated prior to making further changes. The validation process includes retrieving the most recent statistics, watching critical items such as dropped calls percentage, re-computing the congestion ratios and comparing them with previous values. Further changes are made only if performance improvement, such as fewer dropped calls or better balanced load, is expected. Otherwise, previous parameters won't be altered for some time.

Retrieving and analyzing switch statistics is a continuous process so that when network quality degrades again as a result of imbalanced traffic, the dynamic load balancing algorithm runs until target criteria are met. Since the algorithm implemented in the dynamic load balancing apparatus relies on actual live network statistics rather than assumptions regarding propagation environment and traffic density, the results are more accurate than off-line tools and network improvement will be seen in real-time without the need for additional engineering cost of making drive tests and further data analysis.

Figure 4:
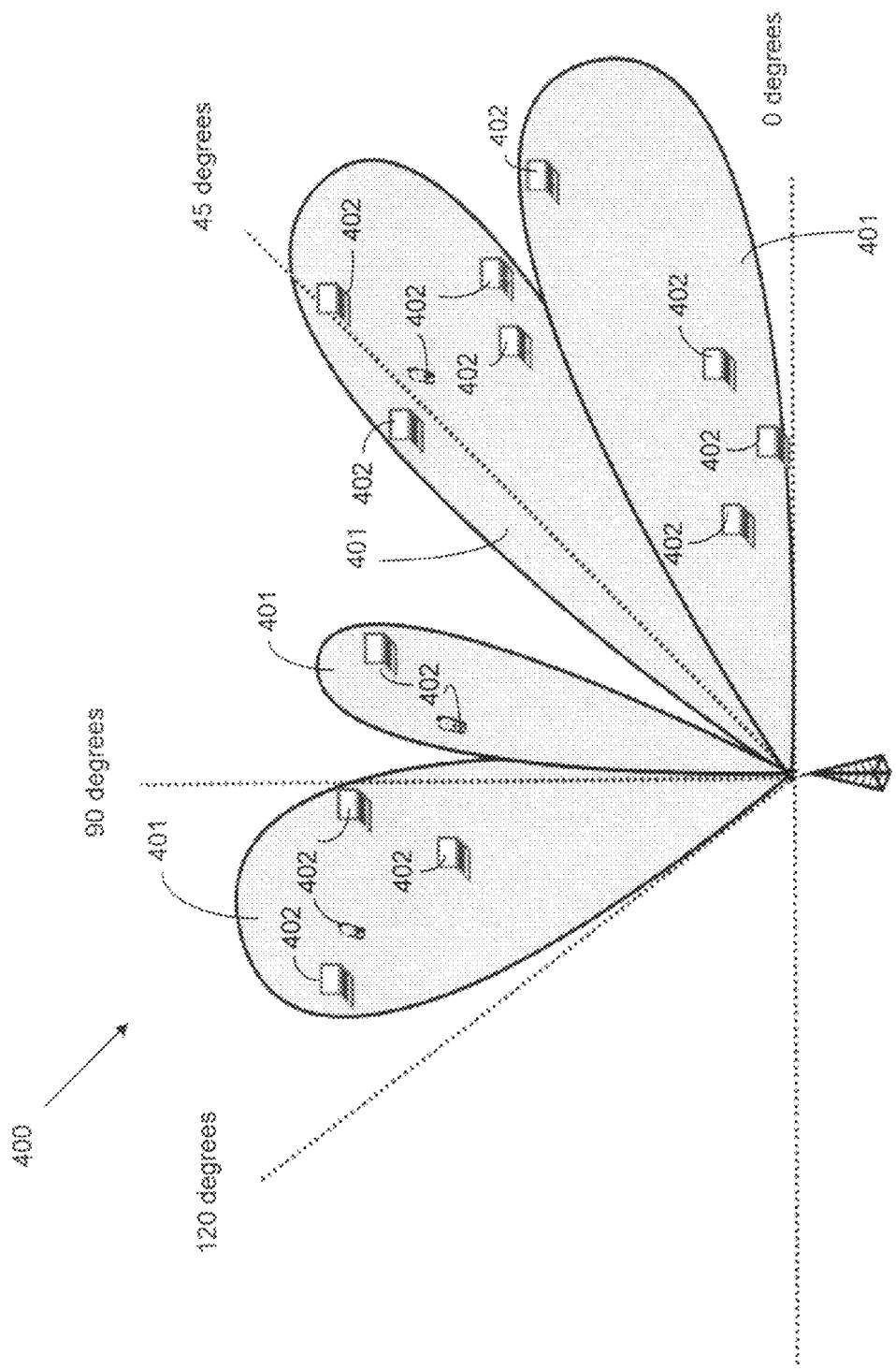
FIG. 4 illustrates an exemplary balanced coverage area in accordance with an embodiment of the invention.
Figure 5:
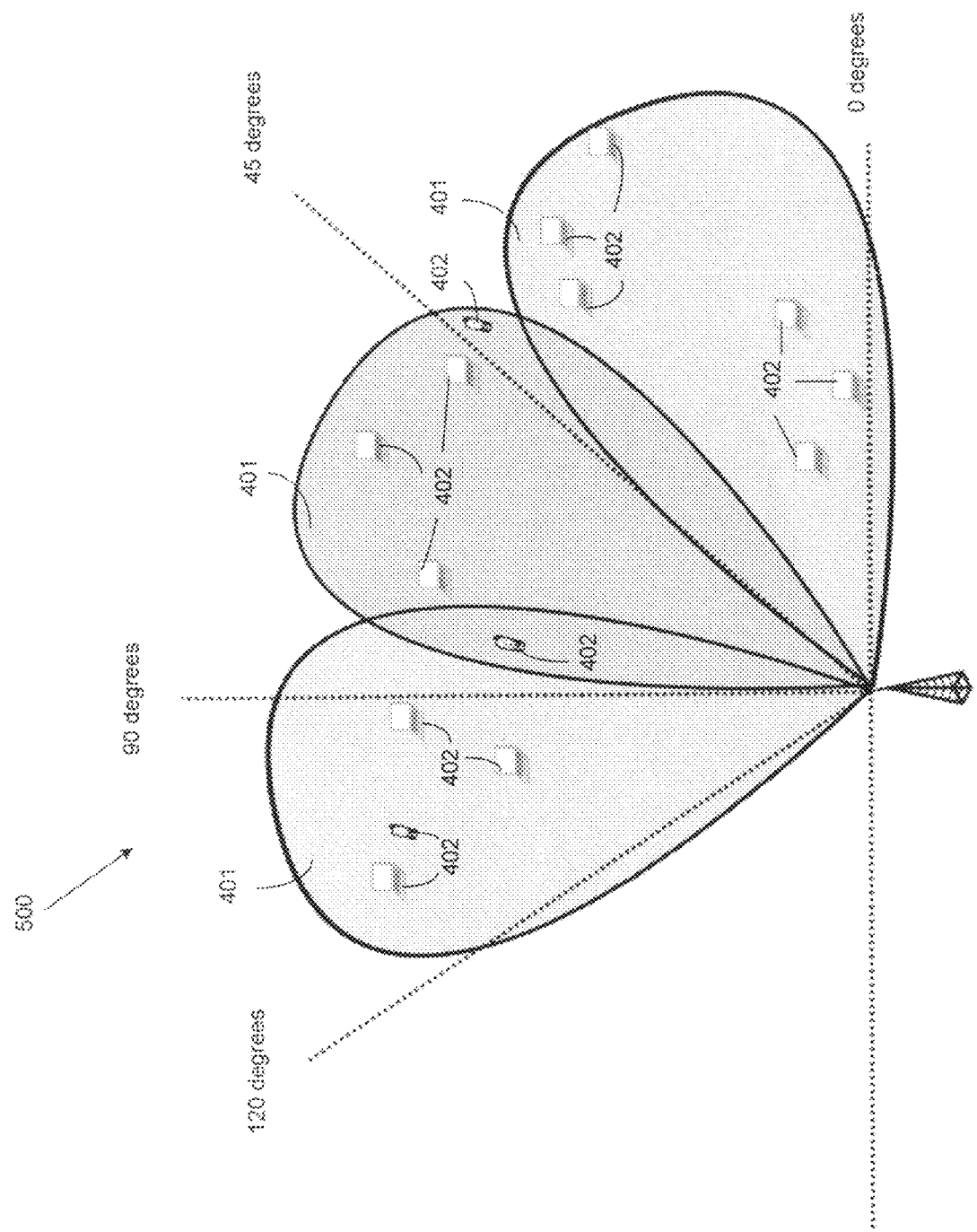
FIG. 5 illustrates another exemplary balanced coverage area in accordance with an embodiment of the invention.

FIGS. 4 and 5 illustrate exemplary balanced coverage areas in accordance with an embodiment of the invention. The load balancing algorithm controls coverage areas 401 such that areas not containing subscribers 402 do not need to be covered for fixed wireless systems and therefore a finite amount of power at the base station 103 can be used to further increase the reach of the coverage areas 401 serving subscribers 402.

As seen in FIG. 4, the coverage areas 401 are narrowed to cover only the areas that contain subscribers 402. The narrower the coverage area 401 the higher the reach for a constant amount of power. For mobile systems, such as IEEE802.16e-2005 or 3GPP LTE, coverage areas are optimized to support mobility with the least amount of overhead.

As seen in FIGS. 5, the coverage areas 401 are overlaid or overlapping for servicing subscribers 402 in different frequency bands for further capacity. Such overlay can correspond to the same or different wireless technology. Additionally, the overlapping of coverage areas 401 can be minimized to reduce the number of subscribers 402 being in handover zones.

Each coverage area 401 behaves as an independent sector serving its own set of subscribers 402. Receive diversity is supported by the same coverage areas generated by means of an orthogonal polarization in the antenna or totally separate antennas. Alternatively, receive diversity is supported in angular domain by associating a coverage to one base antenna port and another coverage area, typically the adjacent one, to another port. However both coverage areas are active in the transmit direction.

Similarly, multiple input multiple output (MIMO) modes are supported by feeding similar coverage areas to each MIMO branch using polarization, angle or space domains. For fixed wireless systems, such as IEEE802.16-2004, each coverage area can be used by a single base station or plurality of base stations operating each on a different frequency channel. For mobile systems, subscribers of a single coverage area are served by a single base station that can be a single frequency channel for IEEE802.16e-2005 or multiple frequency channels that can be supported by IEEE802.16m.

Figure 6:
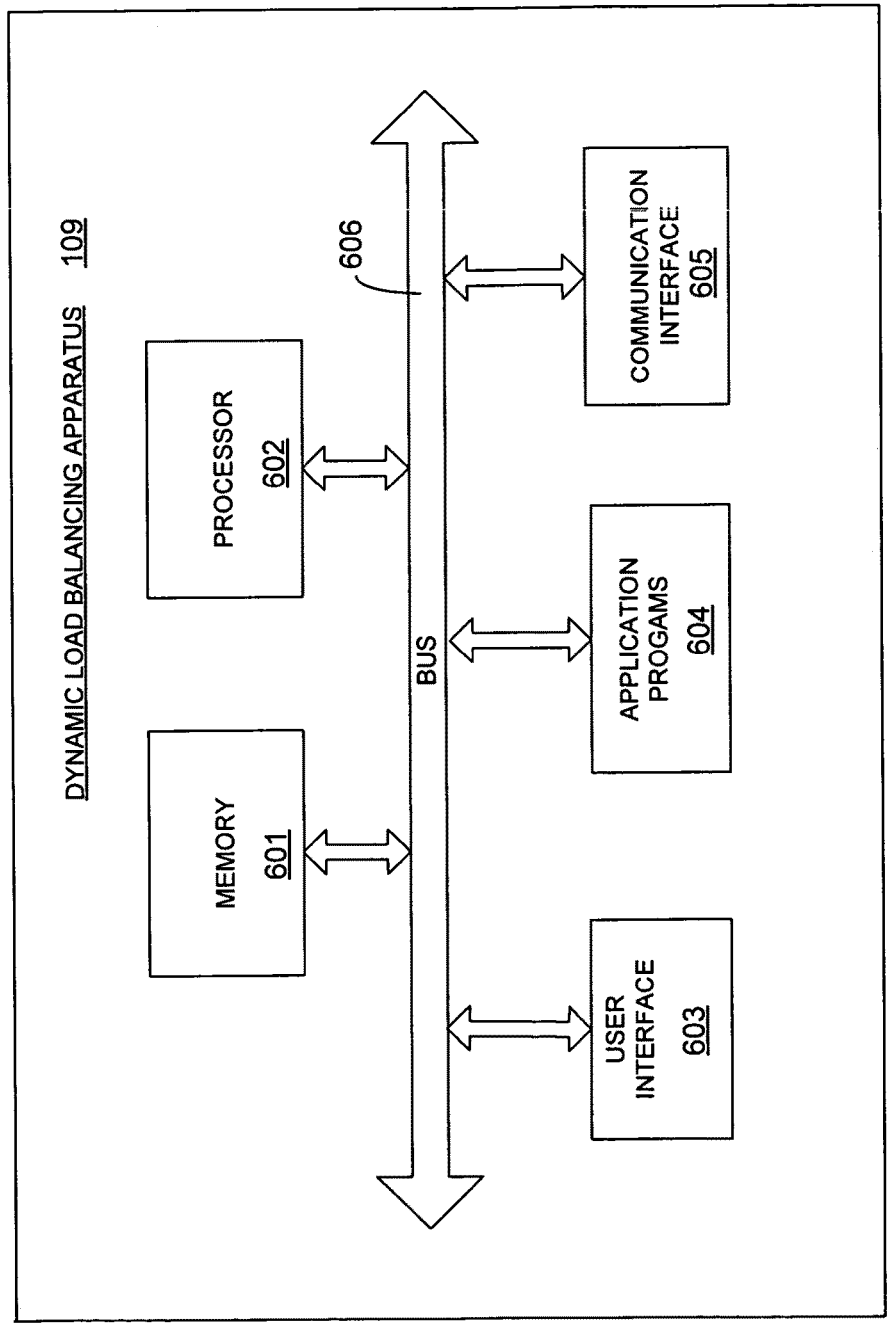
FIG. 6 illustrates a dynamic load balancing apparatus in accordance with an embodiment of the present invention.

FIG. 6 is a more detailed description of the dynamic load balancing apparatus 109 illustrated in FIGS. 1 and 2 for performing the method of dynamic load balancing as previously described with reference to FIG. 3. In FIG. 6, the dynamic load balancing apparatus 109 includes a memory 601, a processor 602, user interface 603, application programs 604, communication interface 605, and bus 606.

The memory 601 can be computer-readable storage medium used to store executable instructions, or computer program thereon. The memory 601 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program is also intended to include an algorithm that includes executable instructions stored in the memory 601 that are executable by one or more processors 602, which may be facilitated by one or more of the application programs 604. The application programs 604 may also include, but are not limited to, an operating system or any special computer program that manages the relationship between application software and any suitable variety of hardware that helps to make-up a computer system or computing environment of the dynamic load balancing apparatus 601. General communication between the components in the dynamic load balancing apparatus 601 is provided via the bus 606. The dynamic load balancing algorithm as described with reference to FIG. 3 can be stored, for example, in the memory 601 of the dynamic load balancing apparatus 109.

The user interface 603 allows for interaction between a user and the dynamic load balancing apparatus 601. The user interface 603 may include a keypad, a keyboard, microphone, and/or speakers. The communication interface 605 provides for two-way data communications from the dynamic load balancing apparatus 601. By way of example, the communication interface 605 may be a digital subscriber line (DSL) card or modem, an integrated services digital network (ISDN) card, a cable modem, or a telephone modem to provide a data communication connection to a corresponding type of telephone line. As another example, communication interface 605 may be a local area network (LAN) card (e.g., for Ethernet™ or an Asynchronous Transfer Model (ATM) network) to provide a data communication connection to a compatible LAN.

Further, the communication interface 605 may also include peripheral interface devices, such as a Universal Serial Bus (USB) interface, a Personal Computer Memory Card International Association (PCMCIA) interface, and the like. The communication interface 605 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown).

In an embodiment of the invention, the dynamic load balancing algorithm is based on the following steps: 1) clustering users based on their instantaneous locations or by means of heuristic approaches; and 2) collecting statistics to validate previous users clustering decisions and/or predicting new traffic patterns; and 3) continuous learning and adaptively shaping coverage areas and altering network parameters as the environment or traffic density changes with time.

Retrieving and analyzing switch statistics is a continuous process so that when network quality degrades again as a result of imbalanced traffic, the dynamic load balancing algorithm runs until target criteria are met. Since the algorithm implemented in the dynamic load balancing apparatus relies on actual live network statistics rather than assumptions regarding propagation environment and traffic density, the results are more accurate than off-line tools and network improvement will be seen in real-time without the need for additional engineering cost of making drive tests and further data analysis.

From the description provided herein, those skilled in the art are readily able to combine software created as described with the appropriate general purpose or special purpose computer hardware for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

What is claimed is:

1. A method, comprising:
   determining, using a location unit, a location of each subscriber from a plurality of subscribers in a wireless communication network;
   evaluating cell congestion based on the location of each subscriber from the plurality of subscribers in the wireless communication network;
   altering at least one network parameter from a plurality of network parameters based on the cell congestion, the at least one network parameter includes a characteristic of at least one antenna associated with the cell;
   narrowing a geographic coverage area of a cell from a plurality of cells in the wireless communication network based on the at least one network parameter, such that overlap of a geographic coverage area of each cell from the plurality of cells is reduced to reduce a number of subscribers in handover zones; and
   determining if there is an improvement in the cell congestion based on the at least one network parameter,
   the altering and the evaluating being performed repeatedly and without calculating propagation environment assumptions until an operational condition in the wireless communication network is satisfied.

2. The method of claim 1, wherein the plurality of network parameters include operating parameters of the wireless communication network and subscriber parameters.

3. The method of claim 2, wherein the operating parameters of the wireless communication network include network topology parameters.

4. The method of claim 2, wherein the operating parameters of the wireless communication network include equipment and installation characteristics.

5. The method of claim 1, wherein the location of each subscriber from the plurality of subscribers is determined based on an instantaneous location of each subscriber from the plurality of subscribers or using a heuristic approach.

6. The method of claim 1, wherein the narrowing is based on at least one of altering a pointing direction of at least one antenna associated with the cell or a transmit power of at least one base station associated with the cell.

7. The method of claim 1, wherein the narrowing reduces cell congestion by optimizing the geographic coverage area according to the location of each subscriber from the plurality of subscribers in the wireless communication network.

8. The method of claim 1, wherein the narrowing minimizes overlap of a geographic coverage area of each cell from the plurality of cells to reduce a number of subscribers in handover zones.

9. The method of claim 1, wherein the cell is a first cell from the plurality of cells, the method further comprising:
   increasing a geographic coverage area of a second cell from the plurality of cells in coordination with the narrowing.

10. The method of claim 1, wherein the determining includes determining if there is an improvement in the cell congestion based on a dropped call percentage and a congestion ratio.

11. The method of claim 1, wherein the characteristic of the antenna is an antenna pointing direction (Azimuth), an antenna height, an antenna model, an azimuth beamwidth (BW), an elevation beamwidth (BW), an electrical tilt or a mechanical tilt.

12. The method of claim 1, wherein the characteristic of the antenna is a power-independent characteristic.

13. A non-transitory processor-readable medium storing code representing instructions to be executed by a processor, the code comprising code to cause the processor to:
   determine, using a location unit, a location of each subscriber from a plurality of subscribers in a wireless communication network having a plurality of cells;
   evaluate cell congestion based on the location of each subscriber from the plurality of subscribers in the wireless communication network;
   alter a characteristic of an antenna associated with at least one cell from the plurality of cells based on the cell congestion to define a narrowed coverage area of the at least one cell, such that overlap of a geographic coverage area of each cell from the plurality of cells is reduced to reduce a number of subscribers in handover zones;
   alter a characteristic of an antenna associated with at least one remaining cell from the plurality of cells to define an increased coverage area of the at least one remaining cell and to compensate for the narrowed coverage area of the at least one cell, the increased coverage area being defined in coordination with the narrowed coverage area; and
   determine, based on the narrowed coverage area and the increased coverage area, if there is an improvement in the cell congestion,
   the code to cause the processor to evaluate, alter for the narrowed coverage area and alter for the increased coverage area being repeatedly executed until an operational condition in the wireless communication network is satisfied.

14. The non-transitory processor-readable medium of claim 13, wherein the code to cause the processor to alter for the narrowed coverage area includes code to cause the processor to alter for the narrowed coverage area based on a change in at least one of an operating parameter of the wireless communication network or a subscriber parameter.

15. The non-transitory processor-readable medium of claim 14, wherein the operating parameter of the wireless communication network includes a network topology parameter.

16. The non-transitory processor-readable medium of claim 14, wherein the operating parameter of the wireless communication network includes an equipment and installation characteristic.

17. The non-transitory processor-readable medium of claim 13, wherein the location of each subscriber from the plurality of subscribers is determined based on an instantaneous location of each subscriber from the plurality of subscribers or using a heuristic approach.

18. The non-transitory processor-readable medium of claim 13, wherein the code to cause the processor to alter for the narrowed coverage is based on altering a pointing direction of the antenna associated with the at least one cell.

19. The non-transitory processor-readable medium of claim 13, wherein the code to cause the processor to alter for the narrowed coverage reduces cell congestion by optimizing a geographic coverage area of the at least one cell according to actual subscriber distribution within the wireless communication network.

20. The non-transitory processor-readable medium of claim 13, wherein the code to cause the processor to alter for the narrowed coverage minimizes overlap of a geographic coverage area of each cell from the plurality of cells to reduce a number of subscribers in handover zones.

21. The non-transitory processor-readable medium of claim 13, wherein the code to cause the processor to determine includes code to cause the processor to determine if in the cell congestion improves based on a dropped call percentage and a congestion ratio.

22. The non-transitory processor-readable medium of claim 13, wherein the characteristic of the antenna is an antenna pointing direction, an antenna pointing direction (Azimuth), an antenna height, an antenna model, an azimuth beamwidth (BW), an elevation beamwidth (BW), an electrical tilt or a mechanical tilt.

23. The non-transitory processor-readable medium of claim 13, wherein the characteristic of the antenna is a power-independent characteristic.

24. The non-transitory processor-readable medium of claim 13, wherein the code to cause the processor to alter for the narrowed coverage area also includes code to cause the processor to alter a second network parameter.

25. The non-transitory processor-readable medium of claim 13, wherein the code to cause the processor to alter for the increased coverage area includes code to cause the processor to alter a second network parameter.

26. The non-transitory processor-readable medium of claim 24, wherein the second network parameter is associated with the at least one cell.

27. The non-transitory processor-readable medium of claim 25, wherein the second network parameter is associated with the at least one remaining cell.

28. An apparatus, comprising:
a dynamic load balancing module implemented in a memory or a processing device, the dynamic load balancing module configured to receive network topology information including geographic location information of at least one base station within a wireless communication network, the dynamic load balancing module configured to evaluate cell congestion in the wireless communication network based on a location of each subscriber from a plurality of subscribers, the dynamic load balancing module configured to repeatedly alter at least one network parameter based on the cell congestion and the location information such that at least one geographic coverage area from a plurality of geographic coverage areas within the wireless communication network is adaptively shaped to reduce an overlap of at least two of the geographic coverage areas within the wireless communication network to reduce a number of subscribers in handover zones, the at least one network parameter including a characteristic of an antenna associated with the at least one geographic coverage area.

29. The apparatus of claim 28, wherein the location information includes a latitude and a longitude of the at least one base station.

30. The apparatus of claim 28, wherein the location information includes a height above ground of an antenna of the at least one base station.

31. The apparatus of claim 28, wherein the location information includes a height above sea level of an antenna of the at least one base station.

32. The apparatus of claim 28, wherein the dynamic load balancing module is configured to adaptively shape each geographic coverage area from the plurality of geographic coverage areas without calculating propagation environment assumptions.

33. The apparatus of claim 28, wherein the dynamic load balancing module is configured to adaptively shape the at least one geographic coverage area from the plurality of geographic coverage areas by decreasing a size of a first geographic coverage area from the plurality of geographic coverage areas and increasing a size of a second geographic coverage area from the plurality of geographic coverage areas.

34. The apparatus of claim 28, wherein the dynamic load balancing module is configured to determine, after adaptively shaping the at least one geographic coverage area, if an improvement in the cell congestion resulted.

35. The apparatus of claim 28, wherein the characteristic of the antenna is an antenna pointing direction (Azimuth), an antenna height, an antenna model, an azimuth beamwidth (BW), an elevation beamwidth (BW), an electrical tilt or a mechanical tilt.

36. The apparatus of claim 28, wherein the characteristic of the antenna is a power-independent characteristic.

* * * * *